June 17, 1958   H. A. LILJENBERG   2,839,223
SEED AND FERTILIZER SPREADER
Filed Sept. 6, 1956   2 Sheets-Sheet 2
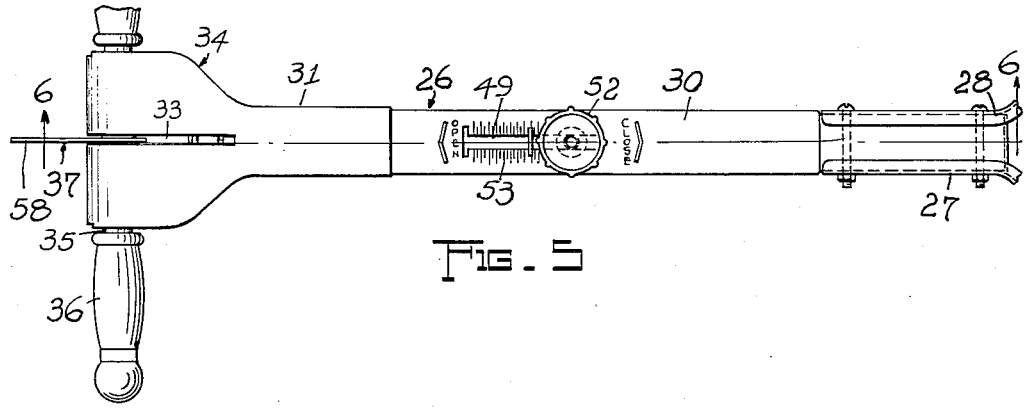
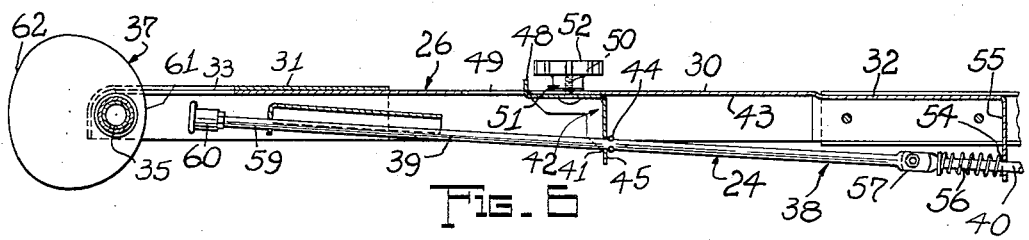
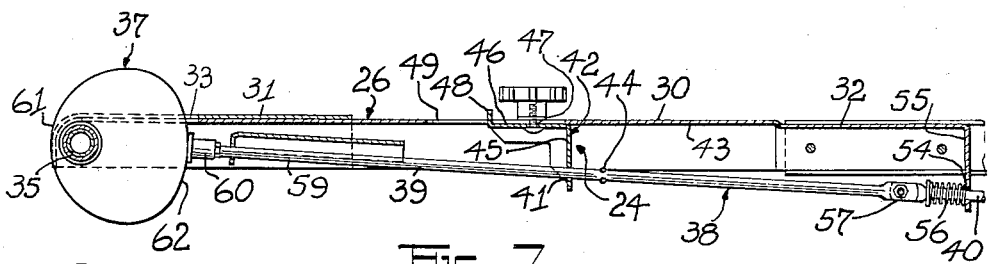
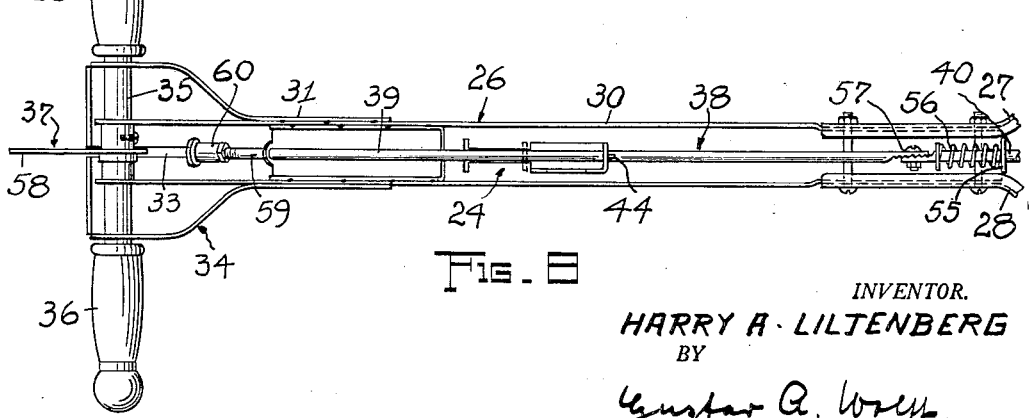
INVENTOR.
HARRY A. LILTENBERG
BY
Gustav A. Wolff
ATT

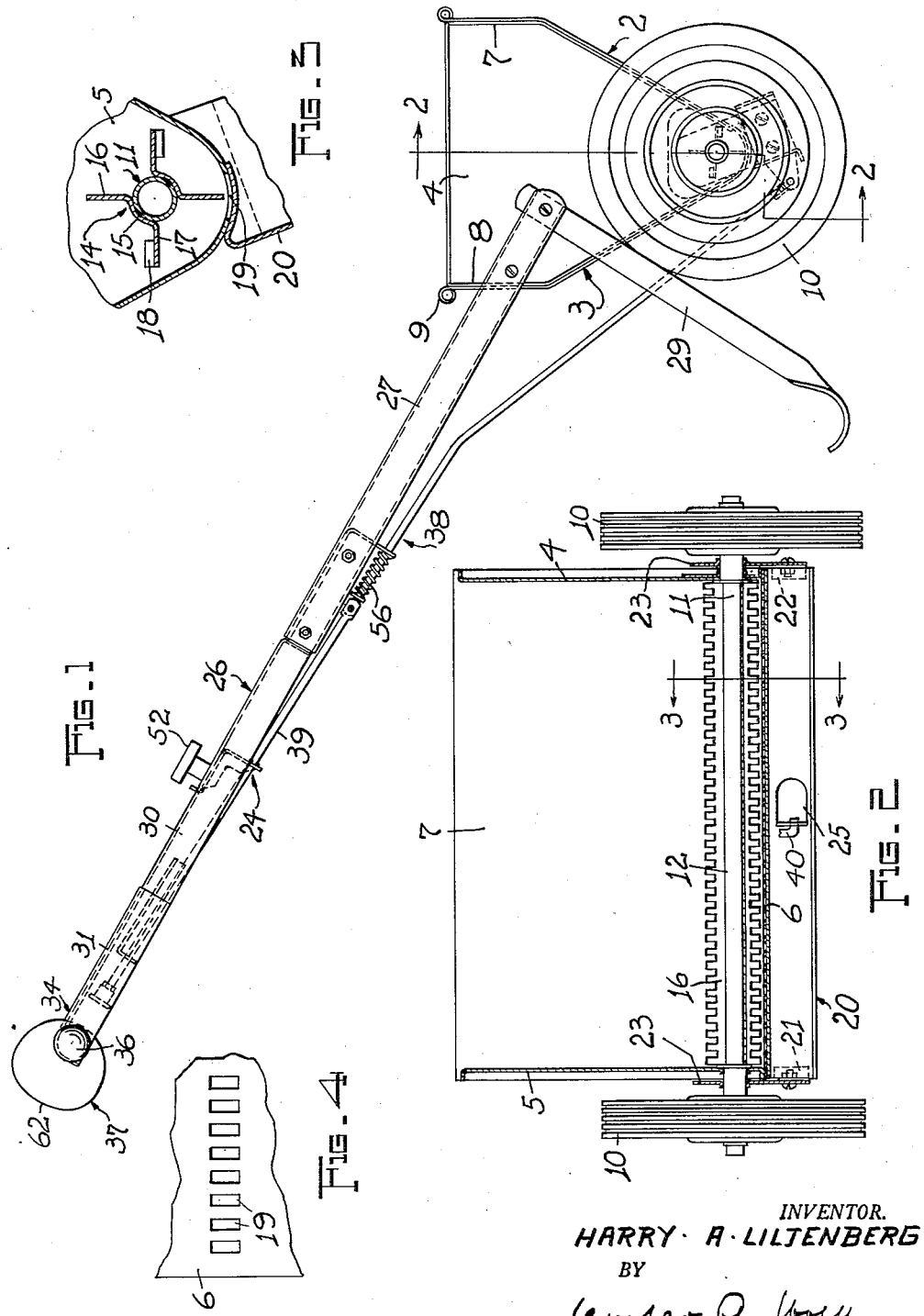

United States Patent Office 2,839,223
Patented June 17, 1958

2,839,223

SEED AND FERTILIZER SPREADER

Harry A. Liljenberg, Cleveland, Ohio, assignor to Modern Tool & Die Company, Cleveland, Ohio, a corporation of Ohio Application September 6, 1956, Serial No. 608,403

6 Claims. (Cl. 222—177)

This invention relates to material spreading apparatus such as seed and fertilizer spreaders adapted to spread predetermined amounts of seed or fertilizer on lawns, gardens, etc., and has particular reference to actuating and controlling mechanism for hand-operated spreaders.

Conventional spreaders of this type discharge their material through discharge openings in elongated, preferably agitated hoppers and control the flow of material through the discharge openings by shiftable shutter means regulating the discharge areas of the discharge openings to effect the desired rate of flow of material from these hoppers. In these spreaders the shutter means are shifted to predetermined positions by control mechanism which is actuated by pivotally supported operating levers coupled directly with the control mechanism and rotatably supported handlebars of handlebar assemblies of the spreaders. Such arrangement interferes with proper control of flow of material from the hoppers when operators pushing the spreaders cause undesired rotation of the handlebars, particularly when the spreaders are pushed over rough and inclined grounds.

The general object of this invention is the provision of a material spreading apparatus of the type referred to above which includes individual spring-actuated control mechanism for automatically shifting the shutter means to any predetermined open position, individual freely rotatably mounted handlebars, and individual operating means for shifting the spring-actuated control mechanism in one direction only, said individual means being mounted on the handlebars in independent relation with respect to the spring-actuated control mechanism to effect by each revolution of the handlebars engagement and disengagement of said means with the control mechanism and shifting of the shutter means to closing position and individual free rotary movement of the handlebars independent of the control mechanism.

Another object of the invention is the provision of a material spreading apparatus of the type referred to above in which the spring-actuated control mechanism is mounted on a handlebar assembly having freely rotatably supported handlebars in which these handlebars support and mount disk-like means having a curved edge including an edge part continuously spaced from the control mechanism to permit individual rotation of the handlebars independent of the control mechanism and an edge part arranged to effect in predetermined positions of the disk-like means contact with the control mechanism and its actuation to effect shifting of the shutter means to closed position.

With the above and other objects in view, the invention has certain other marked superiorities which clearly distinguish it from presently known structures and arrangements of this type. These improvements or characteristics embodying certain novel features of construction and design are clearly set forth in the appending claims, and the preferred form of embodiment of the invention as used in a hand-operated spreader is hereinafter shown with reference to the accompanying drawings forming part of the specification.

In the drawings:

Fig. 1 is a side view of a hand-operated spreader embodying the invention.

Fig. 2 is a sectional view taken on line 2—2 of Fig. 1.

Fig. 3 is a sectional view taken on line 3—3 of Fig. 2.

Fig. 4 is a fragmentary view of the hopper bottom.

Fig. 5 is an enlarged fragmentary plan view of the handlebar assembly of the spreader.

Fig. 6 is a longitudinal sectional view taken on line 6—6 of Fig. 5.

Fig. 7 is a longitudinal sectional view similar to Fig. 6, with the rod assembly shifted to closing position of the discharge openings of the spreader; and Fig. 8 is a bottom view of Fig. 5.

Referring now in detail to the exemplified form of the invention, hand-operated seed and fertilizer spreader 2 shown in the drawings embodies an open top reservoir hopper 3 having laterally spaced upright end walls 4 and 5, a rounded bottom wall 6, and diverging front and rear walls 7 and 8 reenforced at their top edges by rounded flanges or beads 9. Hopper 3 is supported by carrying wheels 10 mounted on a tubular shaft 11 which is journaled in end walls 4 and 5 and supports wheels 10 on outwardly extended end portions with at least one of the wheels coupled to one of the end portions.

Shaft 11 mounts on central portion 12 within hopper 3 a plurality of elongated, substantially V-shaped agitator blades 14 having elongated, curved base portions 15 secured to shaft 11 in symmetrical relation with respect to each other and wing portions 16 and 17 extended radially with respect to shaft 11 and at right angles with respect to each other. Wing portions 16 and 17 are slotted in laterally spaced areas and have such areas bent outwardly to form laterally spaced lugs 18 of rectangular shape arranged in rectangular relation to wing portions 16 and 17.

Hopper 3 embodies on the medial line of its bottom wall 6 a series of elongated rectangularly shaped, laterally spaced discharge openings 19 which are arranged in bottom wall 6 from end to end and parallel to end walls 4 and 5 so that rotation of shaft 11 causes loosening of material by lugs 18 and discharge of loosened material by unbent wing portions 16 and 17 through discharge openings 19.

An elongated shutter bar 20 on shaft 11, which shutter bar is curved to fit the outside of rounded bottom wall 6 of hopper 3, includes at opposite ends ear portions 21, 22 adapted to secure the shutter bar to brackets 23 hinged to shaft 11 and is coupled with actuating mechanism 24 by means of perforated lug 25.

Hopper 3 has attached thereto a handlebar assembly 26 connected to end walls 4 and 5 of hopper 3 by diverging side bars 27, 28 which include on their front ends supporting legs 29. This handlebar assembly embodies a body portion 30 having U-shaped cross section and a handle portion 31 sleeved thereon. Body portion 30 is reduced at its end 32 to facilitate attaching of side bars 27, 28 to end portion 32. Handle portion 31 has its rear end enlarged to a head 34 which rotatably supports a tubular shaft 35 having mounted on its opposite ends handle members 36 arranged to facilitate pushing of the spreader by an operator. In addition, tubular shaft 35 supports on its central portion a cam member 37 which extends through a slot 33 in head 34, is independent of actuating mechanism 24 and effects shifting of shutter bar 20 to a closed position only, as will be described later.

Actuating mechanism 24 embodies an adjustable rod assembly 38 including an upper rod 39 and a lower rod 40 adjustably coupled with each other and linked to lug 25 on shutter bar 20. Upper rod 39 shiftably extends through a hole 41 in control bracket 42 which is shiftably suspended from web 43 of body portion 30 of handlebar assembly 26. Shifting of upper rod 39 is limited by a flattened portion 44 in said upper rod. This control bracket 42, which is angularly shaped, includes in flange 45 hole 41 and in a second flange 46 a hole 47. In addition, control bracket 42 has upwardly extended from flange 46 at one edge thereof a head portion 48 which is extended through a T-slot 49 in web 43 when bracket 42 engages with flange 46 the inner face of web 43. Control bracket 42 is clamped to web 43 by a screw member 50 of a screw assembly 51, which screw member is passed through hole 47 in flange 46 and web 43. Screw assembly 51 embodies a threaded knob 52 which is loosened prior to shifting of control bracket 42 on body portion 30 to bring about a desired position of flange 46 with respect to flattened portion 44 of upper rod 39, a position ascertainable by scale 53 on body portion 30 indicating such position by head portion 48.

The lower rod 40 of adjustable rod assembly 38 extends through a hole 54 in end wall 55 of body portion 30 and supports a compression spring 56 sleeved upon lower rod 40 between end wall 55 and adjustable connection 57 between rods 39 and 40. This compression spring 56 effects shifting of rod assembly 38 and shutter bar 20 to expose discharge openings 19 of hopper 3 until rod assembly 38 is arrested when flattened portion 44 on upper rod 39 engages flange 46 of control bracket 42.

Shifting of rod assembly 38 in a direction to effect exposure of discharge openings 19 is effected only by compression spring 56, and shifting of rod assembly 38 in opposite direction is effected by cam member 37 on axially rotatable tubular shaft 35. This cam member 37, which is independent of actuating mechanism 24, has a peripheral edge 58 opposite end portion 59 of upper rod 39 which, as shown, supports a contact member 60 for proper engagement with peripheral edge 58 whenever desired. Peripheral edge 58 of cam member 37 is formed by two concentric arc portions 61, 62 of different radii which blend into each other. Arc portion 61 has a smaller radius than arc portion 62 and is dimensioned to avoid in certain positions of cam member 37 its contact with contact member 60 of actuating mechanism 24 so as to permit free rotation of shaft 35 through the arc of arc portion 61 for free rotation of shaft 35 with handle members 36 when the spreader discharging material is pushed over ground. Arc portion 62 has a radius dimensioned to contact contact member 60 and shift rod assembly 38 in a direction opposed to the force of compression spring 56 so as to effect closing of discharge openings 19 by shutter bar 20 when actuated upon by a thus shifted rod assembly.

Continuous rotation of tubular shaft 35 in either direction effects successive contact and separation between the arc portions 61, 62 of cam member 37 and actuating mechanism 24 and permits independent shifting of shutter bar 20 to pre-set position by actuating mechanism 24 and limited independent free rotation of tubular shaft 35 and handle members 36 when the spreader 2 while discharging is pushed over rough ground.

Having thus described my invention; what I claim is:

1. A spreader for distributing material comprising a wheeled hopper having discharge openings, a handlebar assembly attached to said hopper, said handlebar assembly including freely rotatably supported handle means crosswise thereof, shiftable shutter means arranged to be shifted to open and close the discharge openings, spring-actuated control means for said shutter means coupled therewith for yieldingly shifting same to open the discharge openings, and shifting means coupled only with the freely rotatable handle means, said shifting means arranged to permit independent rotation of the rotatably supported handle means and independent action of the spring-actuated shutter control means and said shifting means by substantial rotation of the handle means adapted to be shifted into engagement with the spring-actuated shutter control means and actuate same to effect closing of the discharge openings.

2. A spreader for distributing material as described in claim 1, wherein the shifting means coupled with the rotatably supported handle means embodies a disk-like cam member the peripheral surface of which is differentially spaced from the axis of said handle means.

3. A spreader for distributing material as described in claim 1, wherein the spring-actuated shutter control means embodies a spring controlled rod assembly coupled with the shutter means, and wherein the shifting means on said freely rotatable handle means includes a disk-like cam member extended in a plane through the longitudinal axis of the spring-controlled rod assembly.

4. A spreader for distributing material as described in claim 1, wherein said spring-actuated shutter control means embodies a spring-controlled rod assembly supported and guided by the handlebar assembly, wherein the rod assembly has one end coupled with the shutter means and another end freely extended, and wherein the shifting means on the rotatably supported handle means embodies a disk-like cam member with a peripheral edge extended opposite the freely exposed end of the rod assembly, said disk-like cam member having its peripheral edge differentially spaced from the axis of said handle means.

5. A spreader for distributing material as described in claim 4, wherein the freely extended end of the rod assembly mounts a contact member to properly contact the disk-like cam member with the spring-controlled rod assembly.

6. A spreader for distributing material including a wheeled hopper with shutter-controlled discharge openings, handlebar means attached to said hopper, spring-actuated adjustable operating means longitudinally shiftably mounted on said handlebar means adapted to automatically effect exposure of predetermined areas of the shutter-controlled openings, axially freely rotatable handles on the handlebar means, and shifting means for the spring-actuated operating means coupled only with the handles of the handlebar means and rotatable therewith, said shifting means arranged to permit independent action of the spring-actuated operating means and said shifting means by rotation of the rotatable handles adapted to be shifted into engagement with the spring-actuated operating means and actuate same to effect closing of the shutter-controlled discharge openings.

References Cited in the file of this patent

UNITED STATES PATENTS

| | | |
|---|---|---|
| 2,678,145 | Juzwiak et al. | May 1, 1954 |
| 2,710,116 | Juzwiak | June 7, 1955 |
| 2,718,986 | Peoples | Sept. 27, 1955 |
| 2,753,086 | Tuttle | July 3, 1956 |
| 2,767,887 | Bond et al. | Oct. 23, 1956 |